US012581530B2

(12) United States Patent
Changlani et al.

(10) Patent No.: US 12,581,530 B2
(45) Date of Patent: Mar. 17, 2026

(54) SYSTEMS AND METHODS FOR LOW LATENCY TRAFFIC IN NEXT GENERATION WLAN NETWORKS

(71) Applicant: Hewlett Packard Enterprise Development LP, Spring, TX (US)

(72) Inventors: Nitin A. Changlani, San Jose, CA (US); Abhiruchi Dakshinkar, San Jose, CA (US); Eldad Perahia, San Jose, CA (US); Gaurav Patwardhan, San Jose, CA (US); Sachin Ganu, San Jose, CA (US); Mohd Shahnawaz Siraj, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 480 days.

(21) Appl. No.: 18/043,020

(22) PCT Filed: Aug. 26, 2021

(86) PCT No.: PCT/US2021/047775
§ 371 (c)(1),
(2) Date: Feb. 25, 2023

(87) PCT Pub. No.: WO2022/047048
PCT Pub. Date: Mar. 3, 2022

(65) Prior Publication Data
US 2023/0319869 A1 Oct. 5, 2023

Related U.S. Application Data

(60) Provisional application No. 63/070,430, filed on Aug. 26, 2020.

(51) Int. Cl.
*H04W 74/00* (2009.01)
*H04W 84/12* (2009.01)

(52) U.S. Cl.
CPC .......... *H04W 74/006* (2013.01); *H04W 84/12* (2013.01)

(58) Field of Classification Search
None
See application file for complete search history.

(56) References Cited

U.S. PATENT DOCUMENTS 8,553,658 B2 10/2013 Choi et al.
2006/0002428 A1* 1/2006 Trainin ................. H04W 74/08
370/503

(Continued)

FOREIGN PATENT DOCUMENTS

WO 2020/060145 A1 3/2020

OTHER PUBLICATIONS

Chunyu Hu et al., 'Prioritized EDCA Access Slot Management', IEEE 802.II-20/1046r0, Aug. 7, 2020.

(Continued)

*Primary Examiner* — The Hy Nguyen
(74) *Attorney, Agent, or Firm* — Hewlett Packard Enterprise Patent Department

(57) ABSTRACT

Systems and methods are provided for transmitting low latency traffic in next generation wireless local area networks. A new Media Access Control (MAC) layer frame can be transmitted by an AP to establish a reserved time period during which interference from/collisions with other stations transmitting non-high priority data is avoided. Stations with non-high priority data queued for transmission can defer accessing a channel on which to effectuate the transmission until the reserved time period expires.

20 Claims, 9 Drawing Sheets

(56)                References Cited

U.S. PATENT DOCUMENTS

| | | | |
|---|---|---|---|
| 2006/0013189 A1* | 1/2006 | Fujimoto | H04L 1/1671 |
| | | | 370/347 |
| 2011/0075584 A1* | 3/2011 | Teramoto | H04L 45/22 |
| | | | 370/252 |
| 2012/0281533 A1* | 11/2012 | Xhafa | H04W 24/08 |
| | | | 370/252 |
| 2014/0186039 A1* | 7/2014 | Luo | H04Q 11/0067 |
| | | | 398/66 |
| 2015/0244484 A1* | 8/2015 | Tyson | H04J 3/0661 |
| | | | 370/328 |
| 2019/0289616 A1* | 9/2019 | Hampel | H04B 7/0413 |
| 2020/0029350 A1 | 1/2020 | Asterjadhi et al. | |
| 2020/0107393 A1 | 4/2020 | Chu et al. | |
| 2020/0245352 A1 | 7/2020 | Seok et al. | |
| 2021/0204233 A1* | 7/2021 | Li | H04W 56/001 |
| 2022/0255785 A1* | 8/2022 | Lim | H04L 27/26132 |

OTHER PUBLICATIONS

International Search Report and Written Opinion received for PCT Patent Application No. PCT/US2021/047775, mailed on Dec. 9, 2021, 9 pages.
European search report received for EP Application No. 21862749. 5, mailed on Jul. 15, 2024, 11 pages.
Hiertz et al., "IEEE 802.11 s MAC Fundamentals", 2007, IEEE, 8 Pages.
Hu Chunyu et al., "Protected TWT Enhancement for Latency Sensitive Traffic", IEEE 802.11-20/1046r1, Jul. 29, 2020, 17 pages.
Yu et al., "Resource Reservation Schemes for IEEE 802.11-Based Wireless Networks: A Survey", IEEE Communications Surveys & Tutorials, vol. 15, No. 3, Third Quarter 2013, 20 pages.

\* cited by examiner

COMPUTING COMPONENT 500

HARDWARE PROCESSOR 502

MACHINE-READABLE STORAGE MEDIUM 504

WAKE AFTER EXITING A POWER-SAVE MODE
506

TRANSMIT ONE OF A POLLING FRAME OR NULL FRAME TO ITS ASSOCIATED AP
508

RECEIVE HPE FRAME
510

ATTEMPT CAHNNEL ACCESS FOR TRANSMISSION OF QUEUED HP TRAFFIC OR DEFER TRANSMISSION OF QUEUED NON-HP TRAFFIC
512

SYSTEMS AND METHODS FOR LOW LATENCY TRAFFIC IN NEXT GENERATION WLAN NETWORKS

RELATED APPLICATIONS

This application claims the benefit of and priority to U.S. Provisional Patent Application No. 63/070,430, filed on Aug. 26, 2020, the contents of which is incorporated herein by reference in its entirety.

BACKGROUND

In recent years, Wireless Local Area Network (WLAN) technologies have emerged as a fast-growing market. One example of the various WLAN technologies is the Institute of Electrical and Electronics Engineers (IEEE) 802.11 standard. Client devices or stations (STAs) within WLANs communicate with access points (APs) to obtain access to one or more network resources. APs can refer to digital devices that may be communicatively coupled to one or more networks (e.g., Internet, an intranet, etc.). APs may be directly connected to the one or more networks or connected via a controller. An AP, as referred to herein, may include a wireless access point (WAP) that communicates wirelessly with devices using Wi-Fi, Bluetooth or related standards and that communicates with a wired network.

The next generation of WLAN, in accordance with the 802.11be version of the 802.11 standard that is being standardized by the TGbe task group of IEEE, envisions a solution for use-cases involving augmented and virtual reality devices, industrial devices, etc. Such devices require much lower latency than what is currently achievable with sufficient reliability. However, the task group's candidate solutions are insufficient, and further improvements are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
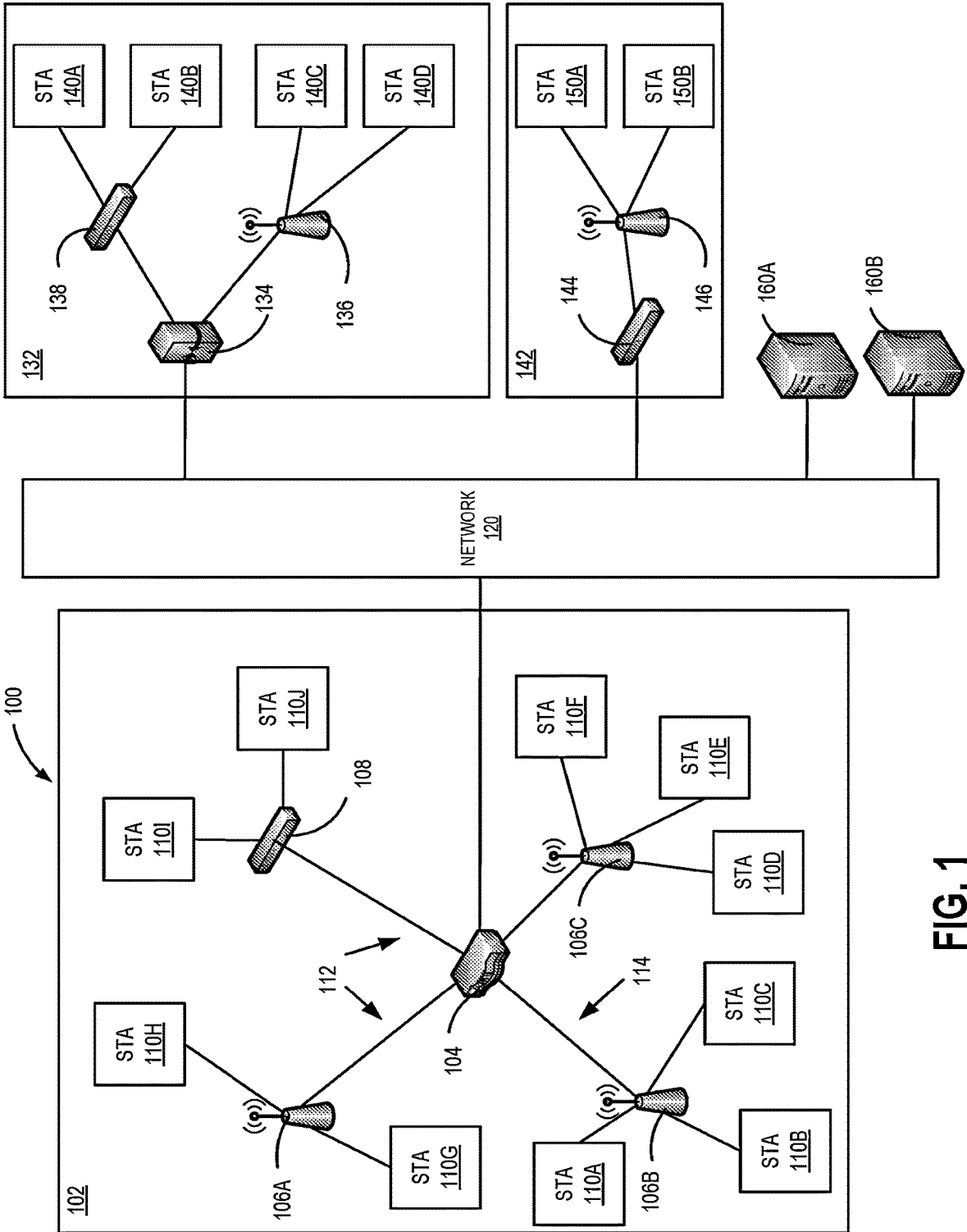
FIG. 1 illustrates an example wireless network deployment in accordance with various embodiments.

The figures are not exhaustive and do not limit the present disclosure to the precise form disclosed.

DETAILED DESCRIPTION

The 802.11be task group proposes either to create: 1) a new access category (AC) with a priority greater than the voice (VO) AC (currently the highest/most latency-sensitive AC) and enhanced distributed channel access (EDCA) parameters that provide more aggressive channel-access than VO; or 2) new traffic identifiers (TIDs) within the VO AC which will be given higher preference for channel-access by the WLAN devices. To increase the reliability of channel-access for the traffic in the new low-latency traffic category (referred to as high-priority (HP) traffic in the context of the present disclosure), the task group proposes to establish certain reserved periods of time during which the stations in the WLAN network can only transmit HP traffic. These time periods may be set either with a predetermined periodicity or a schedule negotiated by the devices, and may exist in addition to scheduled uplink (UL) and downlink (DL) transmissions of the HP traffic as per existing mechanisms.

While the task group intends to solve the problem of channel-access for HP traffic, current candidate solutions are not necessarily optimized to address scenarios involving deployment of multiple APs in an extended service set (ESS), for example, in an enterprise deployment. The task group leaves the protection of the reserved time-periods for HP traffic out of the scope of the standard, which will be required for the scheme to work in a deployment with multiple APs with overlapping Basic Service Sets (OBSSs) operating on the same channel.

Accordingly, various embodiments of the present disclosure are directed to mechanisms that provide "protection" for those time periods during which HP traffic is transmitted. The protection is provided against lower priority traffic (voice, video, and lower priority/less latency-sensitive ACs, for example) in same or overlapping BSSs. That is, during reserved or protected time periods, lower priority traffic in the same or overlapping BSSs will be deferred. In this way, channel-access for the transmission of HP traffic becomes more reliable and does not have to compete with traffic associated with/belonging to other ACs. In particular, reserved periods may be established for HP traffic using a new Media Access Control (MAC) frame, referred to herein as a High Priority Epoch (HPE) frame. An AP may transmit the HPE frame to indicate the start of a reserved HP period, where the HPE frame further includes a Low Priority Network Allocation Vector (LP-NAV) field that can be used by STAs in a channel for their virtual carrier sense mechanism. Upon receipt of an HPE frame, a STA will decode the LP-NAV field and if a STA has non-HP traffic, will defer accessing the channel for the amount of time/duration set forth in the LP-NAV field.

Implementation in the MAC layer, i.e., the HPE frame being contextually decoded at the Media Access Control (MAC) layer, allows the same shared channel to be accessed for the same kind of traffic (HP or non-HP) by all APs in a deployment. Moreover, various embodiments are implemented to achieve minimal operational overhead, allowing embodiments to be extensible as per the degree of overlap among an OBSS and the size of each BSS therein. Further still, embodiments employing the HPE frame can be used to protect against interference with the reserved HP time period, and embodiments can be adapted for use with legacy devices (e.g., devices compliant with 802.11ax and earlier) that may not be able to decode the HPE frame.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106A-C. Switches 108 and wireless APs 106A-C provide network connectivity to various client devices/STAs 110A-J. Using a connection to a switch 108 or AP 106A-C, a STA 110A-J may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authoriza-tion-accounting (AAA) servers, Domain Name System (DNS) servers, Dynamic Host Configuration Protocol (DHCP) servers, Internet Protocol (IP) servers, Virtual Private Network (VPN) servers, network policy servers, main-frames, tablet computers, e-readers, netbook computers, televisions and similar monitors (e.g., smart TVs), content receivers, set-top boxes, personal digital assistants (PDAs), mobile phones, smart phones, smart terminals, dumb termi-nals, virtual terminals, video game consoles, virtual assis-tants, Internet of Things (IOT) devices, and the like.

Within the primary site 102, a switch 108 is included as one example of a point of access to the network established in primary site 102 for wired STA 110I-J. STAs 110I-J may connect to the switch 108 and through the switch 108, may be able to access other devices within the network configu-ration 100. STAs 110I-J may also be able to access the network 120, through the switch 108. The STAs 110I-J may communicate with the switch 108 over a wired 112 connec-tion. In the illustrated example, the switch 108 communi-cates with the controller 104 over a wired 112 connection, though this connection may also be wireless.

Wireless APs 106A-C are included as another example of a point of access to the network established in primary site 102 for STAs 110A-H. Each of APs 106A-C may be a combination of hardware, software, and/or firmware that is configured to provide wireless network connectivity to wire-less STAs 110A-H. In the illustrated example, APs 106A-C can be managed and configured by the controller 104. APs 106A-C communicate with the controller 104 and the net-work over connections 112, which may be either wired or wireless interfaces.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include memory, including read-write memory, and a hier-archy of persistent memory such as ROM, EPROM, and Flash memory. Moreover, as used herein, an AP may refer to receiving points for any known or convenient wireless access technology which may later become known. Specifi-cally, the term AP is not intended to be limited to IEEE 802.11-based APs.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communi-cating with the network 120. A gateway device 134 may be a router, a digital-to-analog modem, a cable modem, a Digital Subscriber Line (DSL) modem, or some other net-work device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodi-ments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a* j, 140*a-d*, 150*a-b* may request and access the multimedia content provided by the content servers 160*a-b*.

The portions of network 120 and/or the individual sites 102, 132, 142, may utilize DFS channels for communication. These DFS channels are required to automatically be vacated upon receipt of a valid radar signal. The valid radar signals may correspond to any suitable standard or standards, and may vary based upon the country, region, or jurisdiction in which the network and/or individual site 102, 132, 142 is located. Vacating a DFS channel can impact the experience of users of the network. Thus, it is desirable to not unnecessarily switch channels. However, interference may accidentally look like a radar signal, creating a false positive.

Returning to embodiments of the present disclosure, and as alluded to above, establishing reserved periods for HP traffic helps to avoid collisions with other traffic (voice/video) that has traditionally been considered high priority. It should be understood that in case the HP traffic is still associated with a VO AC (but assigned a different traffic identifier (TID)), the EDCA parameters remain the same for HP and VO traffic—which in turn can still cause channel contention between the two traffic types if they exist in two different STAs within a (common) BSS. Establishing a reserved time period ensures that only HP data is transmitted within the BSS during that period while the rest of the traffic (if any), including VO traffic, is prevented from accessing the channel, that is, a STA (or AP) does not attempt to access the channel during that reserved period.

It should be noted that a complication to this solution arises because achieving the desired channel access exclusivity for AP traffic when competing non-HP traffic exists in one or more OBSSs is problematic. Traditional mitigation of this problem would require coordination between APs, but may not be feasible. First, APs may not be in the same ESS and may not have a coordination mechanism that falls within the details of the 802.11 standard. That is, like an RTS/CTS frame, it does not matter what/which entity sent the RTS/CTS frame. If a device is not necessarily the intended recipient of an RTS/CTS frame, it will nevertheless set its NAV and defer channel access. This ensures that behavior across all devices (legacy and new/EHT) is consistent in a particular BSS as well as in OBSSs. For example, any AP that heads the HPE frame may allocate time on a medium for HP traffic regardless of whether the AP/client belongs to the same BSS, in the same ESS, a neighboring AP, or any other AP. Second, even if APs could coordinate amongst one another with respect to reserved periods for HP traffic transmission, the maintenance of such coordination would result in considerable overhead due to the extremely stringent latency requirements and the constant requirement of maintaining clock synchronization between the APs.

Accordingly, embodiments are implemented in the MAC layer so that a shared channel can be accessed for the same kind of traffic (HP or non-HP) by all the APs in a deployment. Moreover, embodiments are implemented to have minimal operational overhead, if any at all, to be extensible as per the degree of overlap among OBSS and the size of each BSS.

The aforementioned HPE frame, a new MAC frame, can be used to initiate reserved periods for HP traffic. This HPE frame may be transmitted by an AP to indicate the start of the reserved HP period and may include a LP-NAV "duration" field that may be used by the STAs in the channel for their virtual carrier sense mechanism, i.e., the STAs can interpret the duration field to be used as an LP-NAV. That is, upon decoding the LP-NAV from the HPE frame, all STAs that have only non-HP traffic to transmit defer accessing the channel for the duration reported in the LP-NAV. Thus, the NAV for the non-HP traffic categories will be set or extended if already set by prior frames like the clear-to-send (CTS) frame. It should be understood that a CTS frame can refer to a frame transmitted by an AP (in response to a ready-to-send (RTS) frame transmitted by a STA, the CTS frame being sent decoded/interpreted at the MAC layer (to be used in setting/resetting the NAV). The STA will wait for the CTS frame before any packets are transmitted by the STA. It should be understood that the value of duration field in HPE frame indicating the LP-NAV can be set by referring to a particular timer mechanism regarding low priority traffic, in this instance, that maintains a prediction of future traffic on a channel based on the duration value information seen in previous frame transmissions. Additionally, all STAs that have HP traffic, and may or may not have non-HP traffic, upon decoding the LP-NAV from the HPE frame, defer accessing the channel for the duration reported in the LP-NAV only for the non-HP traffic. STAs may continue to access the channel for their respective HP traffic in case they have any queued for transmission. If a CTS frame preceded the HPE frame and had set the NAV, the HPE frame may reset it for the HP traffic AC.

The HPE frame may be sent by the AP when it has HP traffic to transmit, or at the start of a predetermined or pre-negotiated scheduled reserved HP-period. The advantages of using such an HPE frame include APs that form an OBSS not needing to coordinate their reserved periods. The HPE frame transmitted by one AP that has HP data to transmit/receive can be used as a trigger by all the OBSS APs and non-AP stations, and their reserved periods can start as well. An AP may know if it has data to receive based on mechanisms using Buffer Status Report (BSR) Control from the non-AP stations. Additionally, because the duration field/LP-NAV will be honored by all the Extremely High Throughput (EHT) stations on the channel that receive the HPE frame, it is ensured that the HP traffic will not compete with non-HP traffic from an OBSS for channel access.

In some embodiments, the HPE frame may be sent after a Point Coordination Function (PCF) Interframe Space (PIFS) in order to have the same priority as that of a beacon frame/establish the same type of spacing between transmissions as APs will typically send a beacon after a PIFS period. Again, the HPE frame triggers the start of a reserved period and would require preferred access to the channel to do so. During the (protected) reserved HP period, or in addition to such periods, an AP can perform scheduled single-user (SU)/multil-user (MU) transmissions with the non-AP stations that are scheduled with a strict periodicity on either UL or DL or both directions for their respective HP traffic. The LP-NAV set by the HPE frame may be bounded by a maximum value, and the LP-NAV can be set to an updated value only with certain frequency in the cases where the updated value ends up extending the end-time of the duration of the LP-NAV.

As alluded to above, embodiments address legacy device compatibility. In particular, and for legacy devices that are based on 802.11ax and earlier revisions, the HPE frame can be replaced by a short interframe spacing (SIFS)-separated sequence of two frames: a CTS frame, and an HPE frame. The CTS frame can be used to set the traditional NAV for all the STAs operating on the channel such that the STAs do not try to access the channel for any of the traffic (including HP traffic). In this instance, the CTS frame may use the destination address of the transmitting AP (CTS frame sent to self) in order to avoid being misinterpreted as a response to some other STA. The HPE frame that may be decoded only by the EHT stations may clear the NAV for only HP traffic. In this way, the STAs can try to access the channel only for the HP traffic. In other words, any STA (regardless of whether the STA is a more recent EHT STA, or a legacy STA) will be prevented from transmitting any data, while recognition of the HPE frame by EHT STAs will allow those STAs with HP traffic to transmit such HP traffic during the reserved time period established subsequent to receiving the HPE frame.

Figure 2:
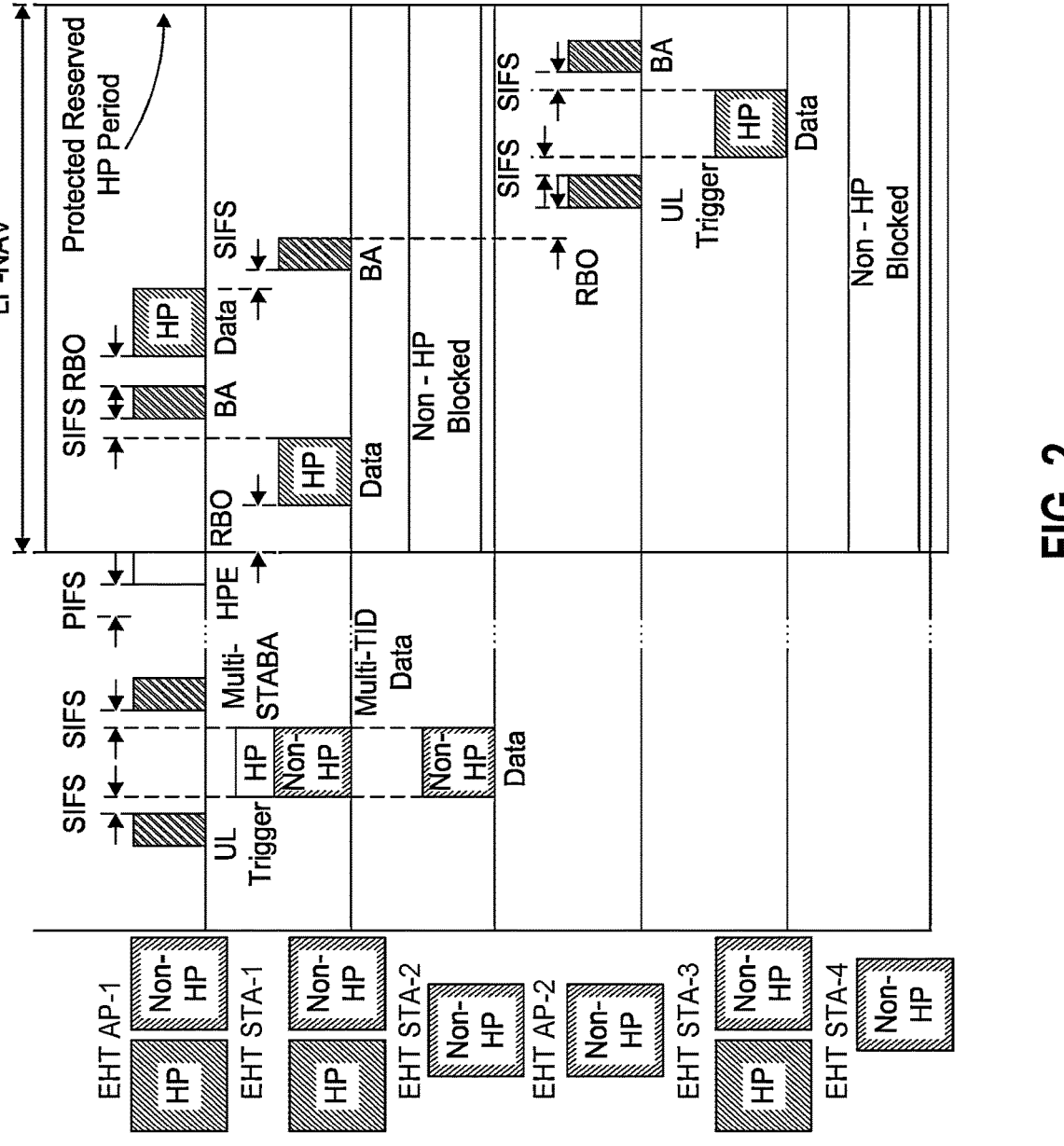
FIG. 2 illustrates an example of a low latency transmission scheme in accordance with one embodiment.

FIG. 2 illustrates an example of STA operation in response to transmission/receipt of an HPE frame in accordance with one embodiment. In this particular example, all APs are EHT APs configured to transmit the HPE frame, and all STAs are EHT STAs capable of decoding the HPE frame. As illustrated in FIG. 2, EHT STA-1 and EHT STA-2 are associated to EHT AP-1, whereas EHT STA-3 and EHT STA-4 are associated to EHT AP-2. EHT STAs 1 and 3 each have HP traffic (along with non-HP traffic) queued for transmission. It should be noted that HP data for transmission may be scheduled by the AP even outside the reserved period.

At some point, an uplink trigger is transmitted by EHT AP-1 to signify to associated STAs (in this case, EHT STAs 1 and 2) that they may transmit queued data to EHT AP-1. After a SIFS, EHT STAs 1 and 2 may proceed with transmitting their respective queued data to EHT AP-1. In the case of EHT STA-1, that queued data includes both HP and non-HP data, while EHT STA-2 only has non-HP data being transmitted. It should be understood that TID refers to an identifier used to select a user priority for a prioritized quality of service, while an AC identifies/characterizes traffic classes those prioritized qualities of service. After a subsequent SIFS has expired, EHT AP-1 may transmit a multi-STA block acknowledgement (BA) to the EHT STAs 1 and 2. EHT AP-1 waits for PIFS, and after that space/interval of time, EHT AP-1 transmits an HPE frame to reserve a protected time period during which channel access for non-HP traffic transmission is deferred, allowing STAs with HP data to access the channel for transmission of the HP data. As described above, the reserved, protected time period can be determined/defined vis-à-vis the LP-NAV. After a random backoff (RBO) time period, any EHT STAs with HP data to transmit may proceed with transmitting that HP data. In this example, EHT STA-1 has HP data to transmit, and may commence with transmitting such data after expiration of the RBO time period.

After a SIFS, a BA, and another RBO time, EHT AP-1 may transmit/forward its HP data. In response, after a SIFS, the EHT STA-1 may acknowledge EHT AP-1's data transmission with a BA. Throughout the reserved, protected time period defined by LP-NAV, as illustrated in FIG. 2, non-HP data is blocked/prevented from being transmitted. In particular, EHT STAs 2 and 4 (and EHT AP-2) each of which have only non-HP data queued, are prohibited from accessing the channel. EHT STAs 1 and 3 only transmit their respective HP data during the reserved, protected time period. It should be understood that when a device, e.g., EHT STA-1 has both HP and non-HP traffic that is interleaved in its transmit queue, it can access/try to access the channel to send its queued HP data, but once it reaches non-HP queued data, it will defer access to the channel/medium. It should be understood that use of a single transmit queue is only one type of contemplated implementation, and other types of implementation are possible.

As alluded to above, the 802.11be task group does not address the protection of the reserved time periods for HP traffic in the standard, which is needed for the scheme to work in a deployment with multiple APs with OBSSs operating on the same channel. Accordingly, as illustrated in FIG. 2, after another RBO time period, EHT AP-2 (whose BSS overlaps with that of EHT AP-1, may send its UL trigger to its associated STAs to allow any EHT STA with HP data queued for transmission to access the channel to transmit that HP data. That is, because EHT AP-1 and 2's BSSs overlap, EHT AP-2 hears the HPE frame sent by EHT AP-1, and as discussed immediately above, provides EHT STA-3 the opportunity to access the channel to transmit its queued HP data. In effect, the HPE frame signals to a receiving STA, for example, that it may attempt to access the operating channel if (and only if) it has HP data to transmit with the intent to transmit that HP data, and to otherwise defer channel access. In this example, EHT STA-3 has HP data queued for transmission, and after a SIFS, EHT STA-3 may transmit its HP data. EHT AP-2 may transmit a BA after a SIFS following the transmission of EHT AP-3's HP data. It should be noted that in some embodiments, any STA/AP that hears (receives and can decode) an HPE frame, can attempt to access the shared channel if it has HP data to transmit with the intent to transmit that HP data. It should be understood that typically, traffic falling in the lower priority ACs such as background or best effort traffic comprises high volume traffic that takes up more time to transmit versus higher priority traffic that is typically transmitted in smaller packets.

Figure 3:
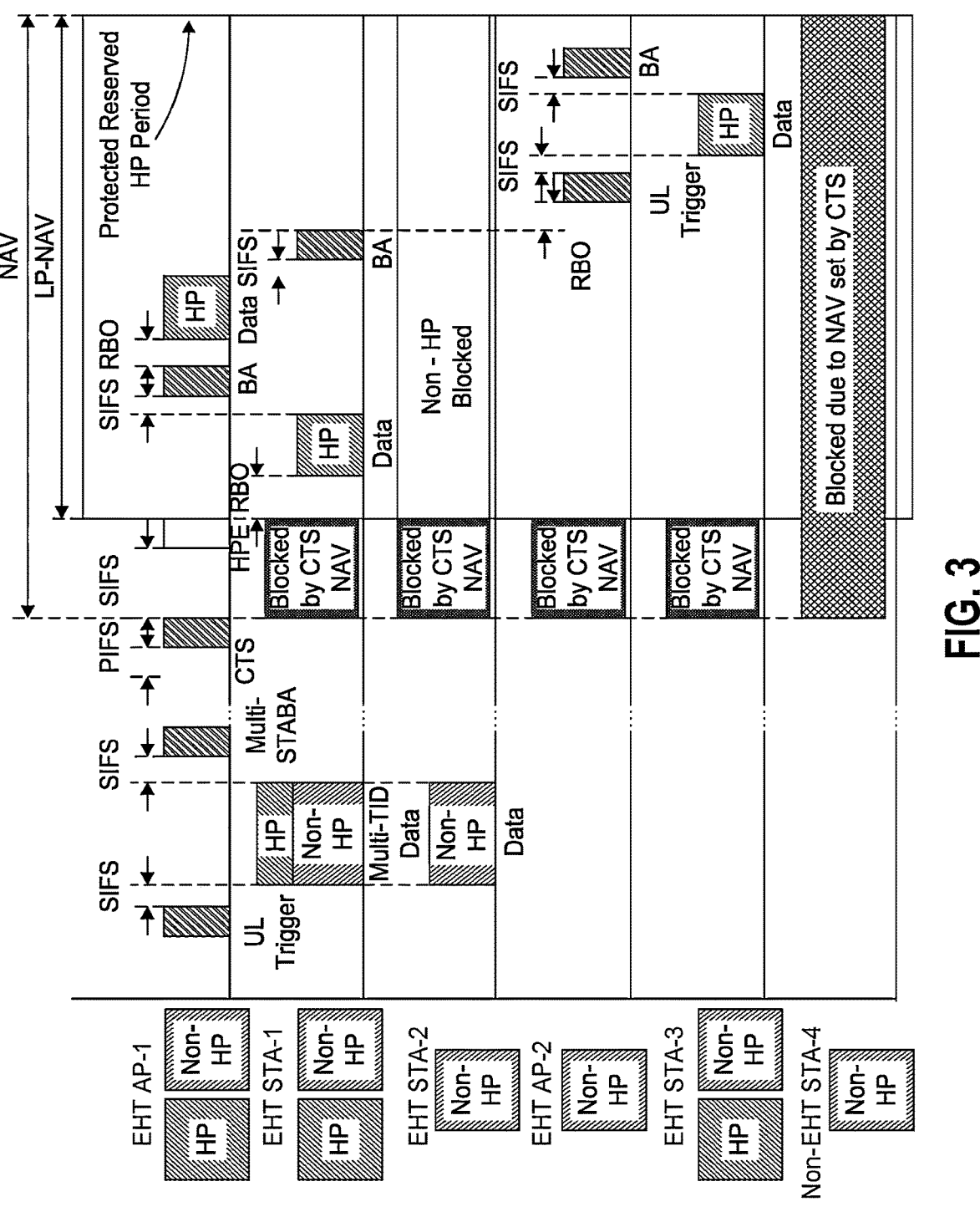
FIG. 3 illustrates an example of a low latency transmission scheme in accordance with another embodiment.

FIG. 3 illustrates an example of STA operation in response to transmission/receipt of an HPE frame in accordance with one embodiment, where at least one STA is a non-EHT STA. In this particular example, all APs are EHT APs configured to transmit the HPE frame, and all STAs are EHT STAs capable of decoding the HPE frame, except for non-EHT STA-4. As illustrated in FIG. 2, EHT STA-1 and EHT STA-2 are associated to EHT AP-1, whereas EHT STA-3 and EHT STA-4 are associated to EHT AP-2. EHT STAs 1 and 3 each have HP traffic (along with non-HP traffic) queued for transmission. It should be understood that APs are aware of associated STAs and accordingly is aware of when transmission of a CTS frame may be needed. It should be noted that in some embodiments, a CTS frame is transmitted, and followed with transmission of an HPE frame.

Similar to the example scenario illustrated in FIG. 2, an uplink trigger is transmitted by EHT AP-1 to signify to associated STAs (in this case, EHT STAs 1 and 2) that they may transmit queued data to EHT AP-1. After a SIFS, EHT STAs 1 and 2 may proceed with transmitting their respective queued data to EHT AP-1. In the case of EHT AP-1, that queued data includes both HP and non-HP data, while EHT STA-2 only has non-HP data being transmitted. After a subsequent SIFS is sent by EHT AP-1, EHT AP-1 may transmit a multi-STA block acknowledgement (BA) to the EHT STAs 1 and 2. EHT AP-1 waits for PIFS, and after that space/interval of time, EHT AP-1 transmits a CTS frame. Transmission of the CTS frame is performed to prevent legacy STAs, such as non-EHT STA-4, from attempting to access the operating channel to transmit non-HP data. Typically, a STA with queued data will send a request-to-send (RTS) frame to an AP, and waits to receive a CTS frame back from the AP. The result is that all other STAs that can hear EHT AP-1 will delay their respective, queued/intended transmissions to allow the STA that sent the RTS frame to transmit/receive packet without any chance of collision. It should be understood that the NAV period is set by the duration field within HPE frame.

Here, the impact of the CTS frame is to prohibit any non-EHT STA/AP from transmitting any queued data, in this example, non-EHT STA-4. Thus, legacy APs/STAs that cannot recognize or decode an HPE frame will nevertheless defer transmission of their data. The CTS frame may set the traditional NAV period. EHT AP-1 may then after SIFS time period transmit an HPE frame to reserve a protected time period during which non-HP traffic transmission is deferred, allowing STAs with HP data to transmit to access the channel for transmission of the HP data. The HPE frame sets the LP-NAV period.

After expiration RBO time period, any EHT STAs with HP data to transmit may proceed with transmitting that HP data. In this example, EHT STA-1 has HP data to transmit, and may commence with transmitting such data after expiration of the RBO time period.

After a SIFS, a BA, and another RBO time, EHT AP-1 may transmit/forward its HP data. In response, after a SIFS, the EHT STA-1 may acknowledge EHT AP-1's data transmission with a BA. Throughout the reserved, protected time period defined by LP-NAV, as illustrated in FIG. 3, non-HP data is blocked/prevented from being transmitted. In particular, EHT STAs 2 and 4 (and EHT AP-2) each of which have only non-HP data queued, are prohibited from accessing the channel. In this example, and as noted above, the HPE frame can be recognized by EHT STA-2, and will defer access to the channel for transmitting non-HP data, while non-EHT STA-4 is blocked from transmitting its queued data pursuant to receipt of the CTS frame. EHT STA 3 similarly transmits its respective HP data during the reserved, protected time period. Again, when a device, e.g., EHT STA-1 has both HP and non-HP traffic that is interleaved in its transmit queue (or has multiple transmit queues), it can access/try to access the channel to send its queued HP data, but once it reaches non-HP queued data, it will defer access to the channel/medium. Similar to the example of FIG. 2, EHT AP-1 and 2's BSSs overlap, allowing EHT AP-2 to hear the CTS and HPE frames sent by EHT AP-1, and as discussed immediately above, provides EHT STA-3 the opportunity to access the channel to transmit its queued HP data. In particular, EHT AP-2 may transmit a BA after a SIFS following the transmission of EHT AP-3's HP data.

Figure 4:
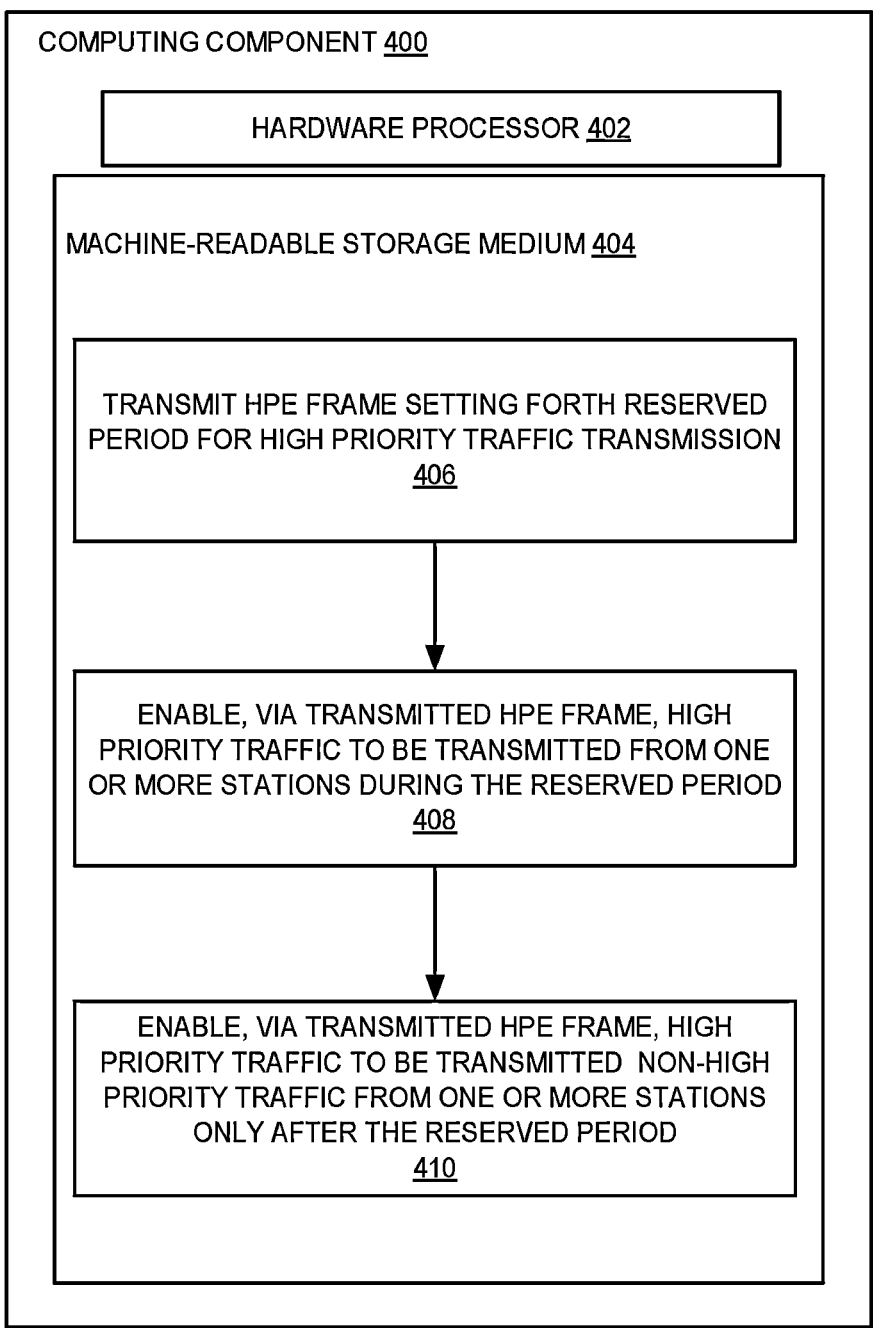
FIG. 4 illustrates an example computing component for effectuating low latency transmission in accordance with one embodiment.

FIG. 4 is a block diagram of an example computing component or device 400 for transmitting low latency data in next generation WLAN networks in accordance with one embodiment. In accordance with one embodiment, computing component 400 may be, for example, a server computer, a controller, or any other similar computing component capable of processing data. In the example implementation of FIG. 4, computing component 400 includes a hardware processor, 402, and machine-readable storage medium, 404. In some embodiments, computing component 400 may be an embodiment of a controller, e.g., a controller such as controller 104 (FIG. 1), or another component of wireless network 100, e.g., an AP such as AP 106A (FIG. 1), for example. In some embodiments, computing component 400 may be an embodiment of a controller of a STA.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-410, to control processes or operations for an AP or STA. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-410.

As noted above, hardware processor 402 may control processes/operations for an AP or STA. Hardware processor 402 may execute instruction 406 to transmit an HPE frame. The HPE frame, as previously discussed above, may set forth the LP-NAV period during which access to an operating channel is blocked/deferred for any network device (AP or STA) that has non-HP traffic queued for transmission. Only HP traffic may be transmitted during the LP-NAV period. As described above, in some embodiments, prior to transmission of the HPE frame, an AP can transmit a CTS frame to prevent any legacy, e.g., non-EHT STAs/APs, device from transmitting data (which will be non-HP data/traffic) during the reserved, LP-NAV period.

The AP, or more specifically, the transmission of the HPE frame from the AP, enables high priority traffic to be transmitted from one or more STAs during the reserved period (408). Again, the HPE frame establishes a reserved period during which only STAs with HP traffic queued may be allowed to contend for channel access. Thus, by virtue of transmitting the HPE frame, the reserved period can be established. It should be noted that in the case of OBSSs, neighboring APs that can hear the HPE frame transmitted by another AP can implement a reserved time period for HP traffic only, where STAs associated to such neighboring APs can transmit their queued HP traffic. It should be noted that STAs can transmit HP data directly (e.g., as peers) between one another if they have queued HP data to transmit and a reserved period has been established.

The AP/transmission of the HPE frame from the AP enables non-HP traffic to be transmitted from one or more STAs only after the reserved period (410). Thus, for those STAs associated to the AP (that sent the HPE frame) or associated to neighboring APs (or even other APs) that were able to decode the HPE frame, access from such STAs to the channel is deferred until after the reserved period passes or is terminated, e.g. when an AP sends a termination instruction frame or signal such as a contention free (CF) end frame or other similar control frame.

It should be noted that in some instances, a reserved period (after transmission of an HPE frame) may nevertheless be violated. That is, STAs may transmit non-HP traffic during such reserved periods in the event that they do not successfully receive the HPE frame. For example, one scenario in which a STA may not receive the HPE frame is when the STA is exiting a power-save mode.

Figure 5:
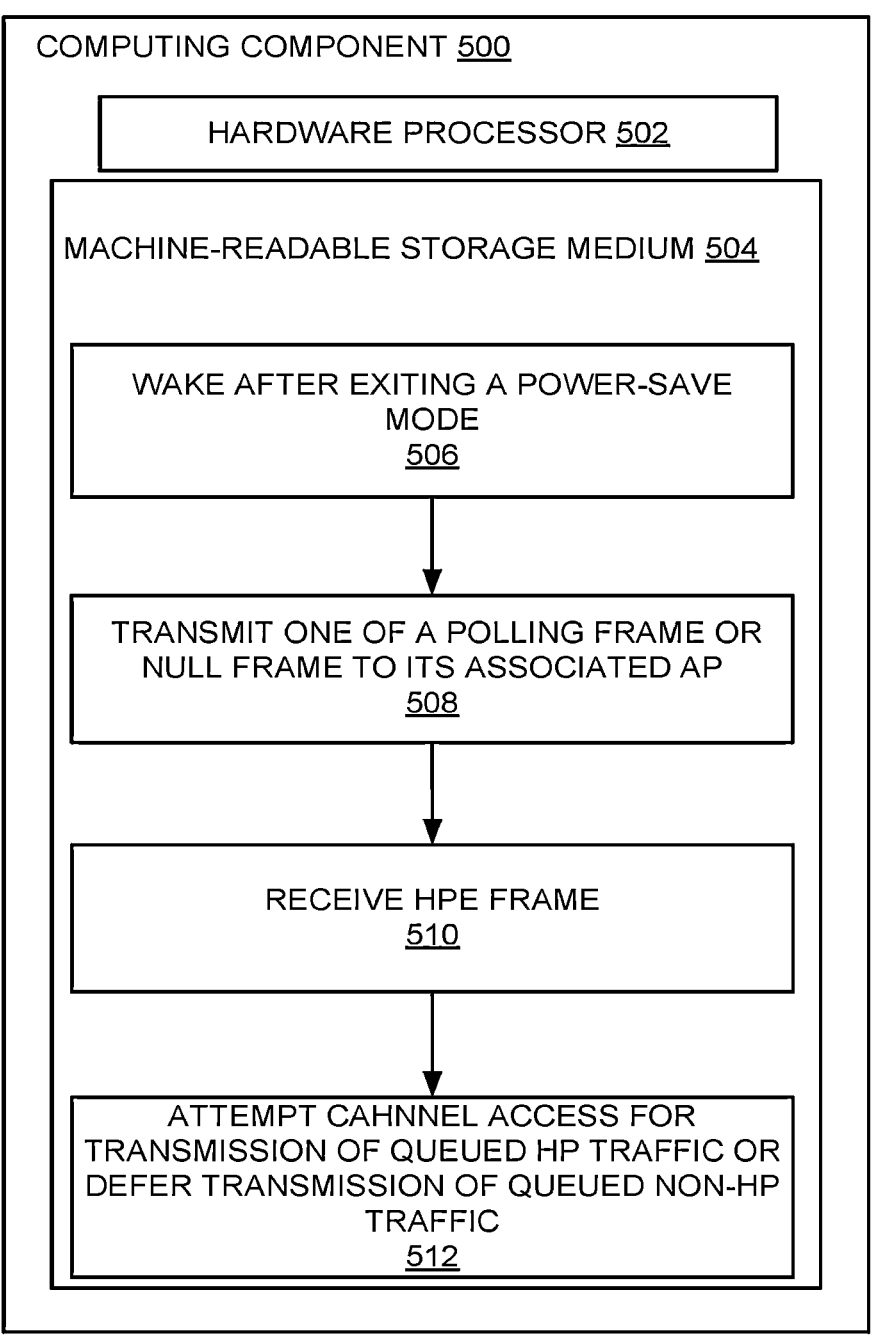
FIG. 5 illustrates an example computing component for effectuating low latency transmission in accordance with another embodiment.

FIG. 5 is a block diagram of an example computing component or device 500 for transmitting low latency data in next generation WLAN networks when STAs are coming out of a power save mode in accordance with one embodiment. In accordance with one embodiment, computing component 500 may be, for example, a server computer, a controller, or any other similar computing component capable of processing data. In the example implementation of FIG. 5, computing component 500 includes a hardware processor, 502, and machine-readable storage medium, 504, which may be similar to/the same as computing component 400, hardware processor 402, and machine-readable storage medium 404. In some embodiments, computing component 500 may be an embodiment of a controller, e.g., a controller such as controller 104 (FIG. 1), or another component of wireless network 100, e.g., an AP such as AP 106A (FIG. 1), for example. In some embodiments, computing component 500 may be an embodiment of a controller of a STA.

To protect against STAs coming out of a power-save mode and possibly transmitting non-HP data during a protected period during which only HP data is to be transmitted, such STAs prompt the transmitting AP to resend/send another HPE frame. In particular, a STA, if in a power-save mode (either in low power mode or performing off-channel activities) will not be able to receive an HPE frame transmitted over a channel if such a STA comes out of power-save mode during the reserved period. Thus, hardware processor 502, which may be an embodiment of a STA processor/controller, may execute instruction 506 to wake after exiting a power-save mode.

Hardware processor 502 may then execute instruction 508 to transmit one of a polling frame or null frame to its associated AP. That is, STAs typically respond to AP beacons in accordance with a listen interval (usually vendor-specific), where upon receiving the beacon, the STA determines whether its association ID (AID) is set in the traffic indication map (TIM). The STA will either send a power save (PS)-Poll frame or a QoS-Null frame with the power management (PM) bit set to 0 (power-save mode bit in the frame control field of the MAC header set to 0) to the AP before transmitting any traffic.

Hardware processor 502 may execute instruction 510 to receive an HPE frame. It should be noted that the aforementioned PS-Poll/QoS-Null frames will be sent only if the STA can gain access to the channel for another AC amidst all the HP traffic that is already accessing the channel. In the event the STA can transmit either of these frames, the AP can acknowledge (ACK) the QoS-Null or PS-Poll frame, and the AP can subsequently transmit the HPE frame once again with a LP-NAV duration that is equal to the original duration less the time elapsed since the original HPE frame was transmitted, or with a new duration in case it has more HP data. This secondary transmission will be within the SIFS duration from the ACK for the QoS-Null frame in order to prevent the now-awake STA from accessing the channel/medium for its non-HP traffic.

Hardware processor 502 may then execute instruction 512 to transmit queued HP traffic to an associated AP, another STA, etc., or transmit of non-HP traffic is deferred. This transmission of queued HP data will occur during the reserved, protected period defined by the LP-NAV less any already-expired time/left over time from the reserved period.

Figure 6:
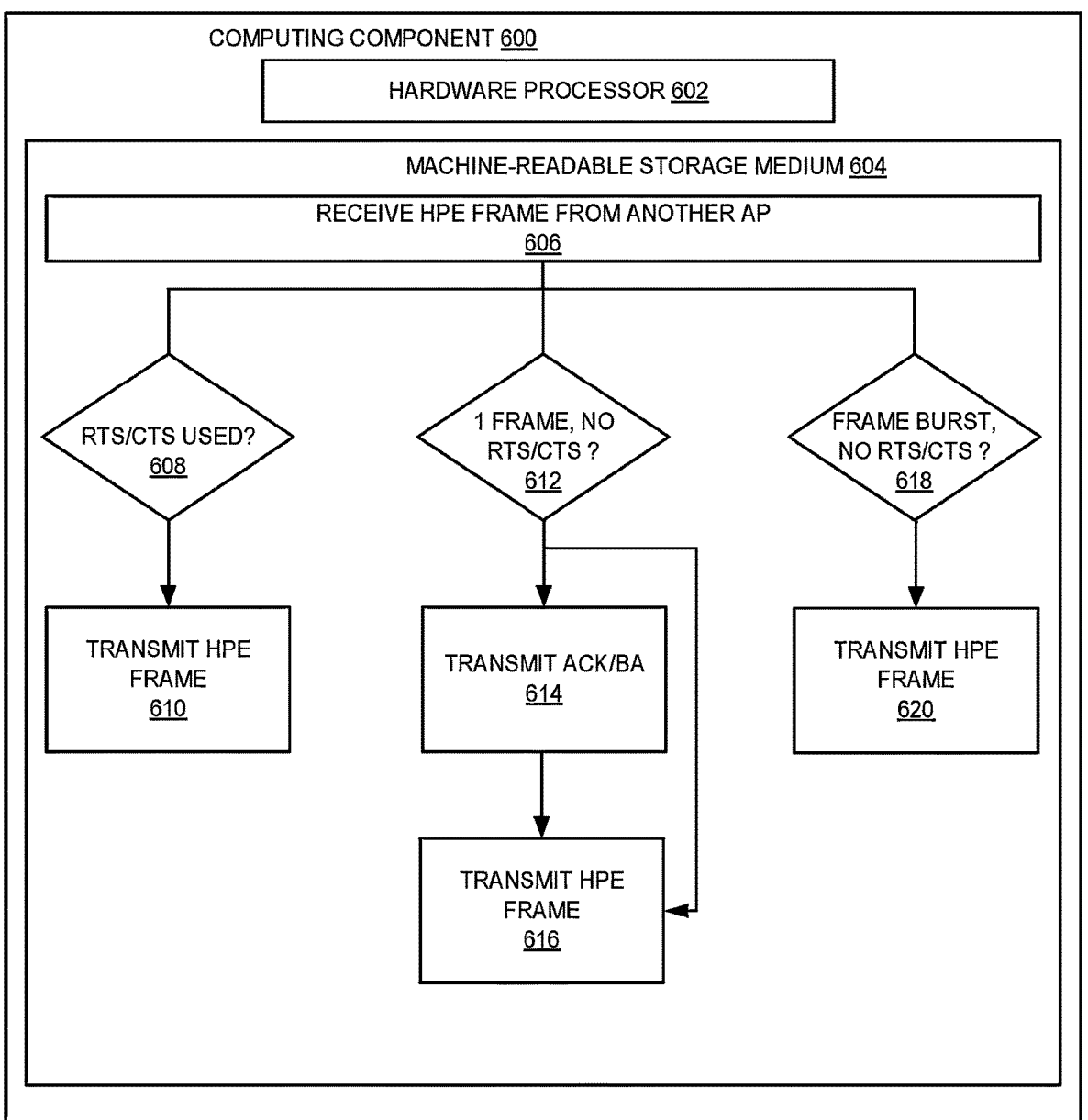
FIG. 6 illustrates an example computing component for effectuating low latency transmission in accordance with yet another embodiment.

FIG. 6 is a block diagram of an example computing component or device 600 for protecting the transmission of low latency data in next generation WLAN networks against hidden STAs in accordance with various embodiments. In accordance with one embodiment, computing component 600 may be, for example, a server computer, a controller, or any other similar computing component capable of processing data. In the example implementation of FIG. 6, computing component 600 includes a hardware processor, 602, and machine-readable storage medium, 604, which may be similar to/the same as computing component 400, hardware processor 402, and machine-readable storage medium 404. In some embodiments, computing component 600 may be an embodiment of a controller, e.g., a controller such as controller 104 (FIG. 1), or another component of wireless network 100, e.g., an AP such as AP 106A (FIG. 1), for example. In some embodiments, computing component 600 may be an embodiment of a controller of a STA.

It should be understood that in some scenarios STAs may be hidden from an AP that transmits the HPE frame, e.g., the STA may be associated to another AP, and may not be able to receive the HPE frame. As a result, the STA result may still access the channel for non-HP traffic. Thus, hardware processor 602 may execute instruction 606 to receive an HPE frame transmitted by another AP. Hardware processor 602 may execute instruction 608 to determine if the RTS/CTS mechanism (described above) is used for the STA's transmissions. If so, hardware processor 602 may execute instruction 610 to transmit an HPE frame. That is, contrary to the previously-described scenario (FIG. 3), the other AP need not (but could) transmit a CTS frame (since the NAV is busy in light of the duration specified by the LP-NAV.

Instead, the other AP may transmit an HPE frame with an LP-NAV duration equal to the original LP-NAV duration minus any time elapsed since the original HPE frame was transmitted. In some embodiments, as an alternative, a new LP-NAV duration may be selected by the other AP. This may be done in case the other AP has more HP data that may be remaining (not completely transmitted by the end of the previous LP-NAV duration). Sending the HPE frame by the other AP can prevent further RTS frames from being sent by the hidden STA.

Subsequent to receiving the (original) HPE frame from an AP (instruction 610), hardware processor 602 may execute instruction 612 to determine whether the hidden STA (associated to the AP that received the original HPE frame) has transmitted a single data frame without using the RTS/CTS mechanism. If so, hardware processor 602 may execute instruction 614 to transmit, from the other AP, an ACK/BA to the hidden STA. Hardware processor 602 may further execute instruction 616 to transmit a second HPE frame within a SIFS duration (as previously explained). Alternatively, similar to the previous scenario, the other AP may simply transmit a new HPE frame without sending the ACK/BA. Again, the reserved period will comprise the LP-NAV associated with the original HPE frame sent by the AP minus any elapsed time since the transmission of the original HPE frame from the AP.

Subsequent to receiving the (original) HPE frame from an AP (instruction 610), hardware processor 602 may execute instruction 618 to determine whether the hidden STA (associated to the AP that received the original HPE frame) has transmitted a burst of data frames, again without using the RTS/CTS mechanism. If the station is associated to another AP that received the HPE frame and transmits a burst of data frames without RTS/CTS, hardware processor 602 may execute instruction 620 to transmit a new/follow-up HPE frame, where the duration of the reserved period is the original LP-NAV duration minus any elapsed time since transmission of the original HPE frame from the AP in the SIFS duration.

It should be noted that to protect against transmission bursts from STAs, the transmission of HPE frames at PIFS protects against frame bursts that are about to being, pending an RBO. Preferential access of the channel prevents the burst from being initiated. If a transmission burst is already in progress, and a reserved period for mHP traffic is needed, an AP will simply send an HPE frame in the SIFS with the duration commensurate with the original LP-NAV minus any elapsed time. The AP need not send any ACK.

It should be noted that if a STA is not associated to an AP that happened to receive the HPE frame transmitted by another AP, APs that happen to receive the HPE frame from the other AP or from a non-AP STA that may happen to be connected with other STAs over a peer-to-peer/TDLS/ad hoc link, may transmit a secondary HPE frame. Again, the LP-NAV sets the reserved period to a duration commensurate with the original LP-NAV less any elapsed time since the original HPE frame was transmitted by the other AP.

Figure 7:
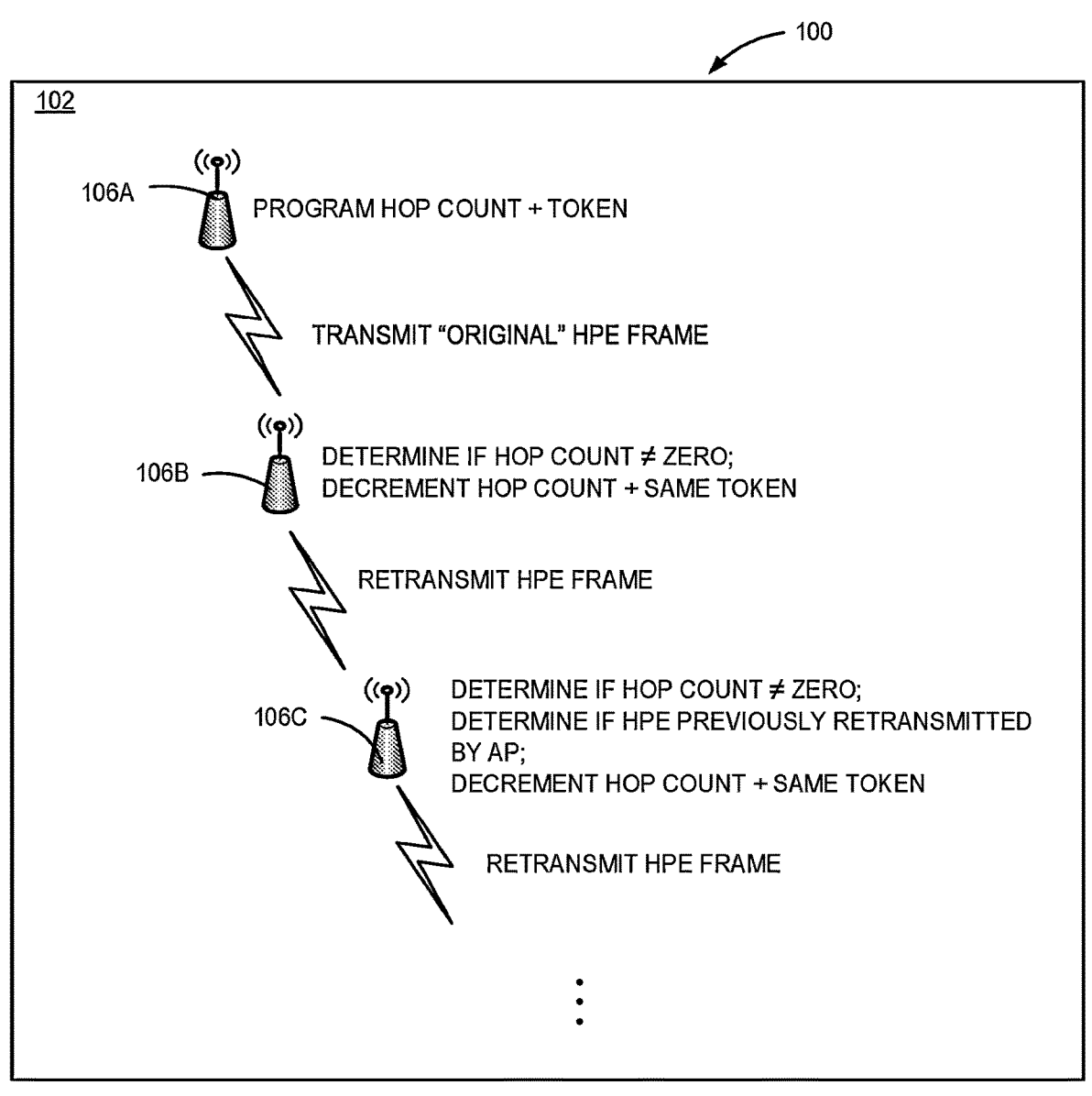
FIG. 7 illustrates an example retransmission scheme for effectuating low latency transmission in accordance with some embodiments.

In accordance with some embodiments, a more general method for addressing potential interference with reserved HP periods, HPE frames originally transmitted by a first AP can be subsequently retransmitted or rebroadcast by other APS in the same OBSS on the channel to preemptively combat interference. FIG. 7 illustrates an example scenario regarding the transmission/retransmission/rebroadcasting of subsequent HPE frames by other APs in an OBSS, FIG. 7 illustrates an example HPE frame retransmission/rebroadcasting scenario in accordance with some embodiments. FIG. 7 illustrates a portion of network configuration 100, in particular, primary site 102 which may include a first AP, 106A, a second AP 106B, and a third AP, 106C. First AP 106A may transmit a first HPE frame (or CTS and first HPE frames). In some embodiments, this first HPE can be transmitted just after a PIFS (FIGS. 2 and 3). AP 106A may program a hop count and token to uniquely identify this first HPE frame.

AP 106B may be a neighboring AP in an OBSS. Upon receipt by AP 106B of the first HPE frame from AP 106A, AP 106B determines if the value of the hop count in the received, first HPE frame is non-zero. If so, AP 106B can retransmit (or rebroadcast) the original/first HPE frame. AP 106B can decrement the hop count by one, but the retransmitted/rebroadcast HPE frame will contain the same token as the original/first HPE frame. It should be noted, that the reserved period can be defined by an LP-NAV reduced by the amount of time commensurate with the duration of the first HPE frame. It should also be noted that the retransmitted/rebroadcast frame is received by AP 106A as well, but AP106A, in this instance drops the HPE frame since it already transmitted the HPE frame what had the token of the received "retransmitted/rebroadcast HPE frame."

To handle the case of a channel having more than one OBSS AP that would receive the first HPE transmission, e.g., if both AP 106B and 106C are associated with overlapping BSSs, the retransmission/rebroadcasting of the HPE frame should not happen at PIFS. Instead, the method of operation includes a back-off mechanism that sets the back-off window to be proportional to the maximum possible value of the hop count minus the current value of the hop count. This helps ensure that as the hop count decreases through decrementing at each subsequent AP, over high degrees of retransmissions/rebroadcasts, the back-off window keeps increasing, thus maintaining a similar capability to avoid collisions as the number of OBSS APs increase over higher degrees of retransmissions.

It should be noted that the hop count associated with the original/first HPE transmission can be set based on the estimated OBSS density around the AP. For example, the denser the OBSS (the more overlapping BSSs exist), the shorter the hop count. For example, the rarer the OBSS (less overlapping BSSs), the higher the hop count. Controlling hop count is performed in this manner because the possibility of having a hidden node, for example in a denser deployment, would be less than that experienced in a rarer OBSS. Hence, the hop count can be kept at a lower value in order to avoid redundant retransmissions/rebroadcasting.

AP 106C may be another neighboring AP in the OBSS. AP 106C can determine if the token in the retransmitted HPE frame does not correspond to an HPE frame that AP 106C previously transmitted/retransmitted/rebroadcasted. If so, AP 106C can determine if the hop count is non-zero. If the hop count is zero, the HPE frame will not be retransmitted/rebroadcasted. If the hop count is indeed non-zero, the hop count is decremented by one, and the same token is maintained. Again, as noted above, the same token is maintained as the HPE frame "progresses" through subsequent APs. In this instance, the (past) duration over which this determination is made is equal to at least the LP-NAV duration associated with the first HPE frame transmission.

Figure 8:
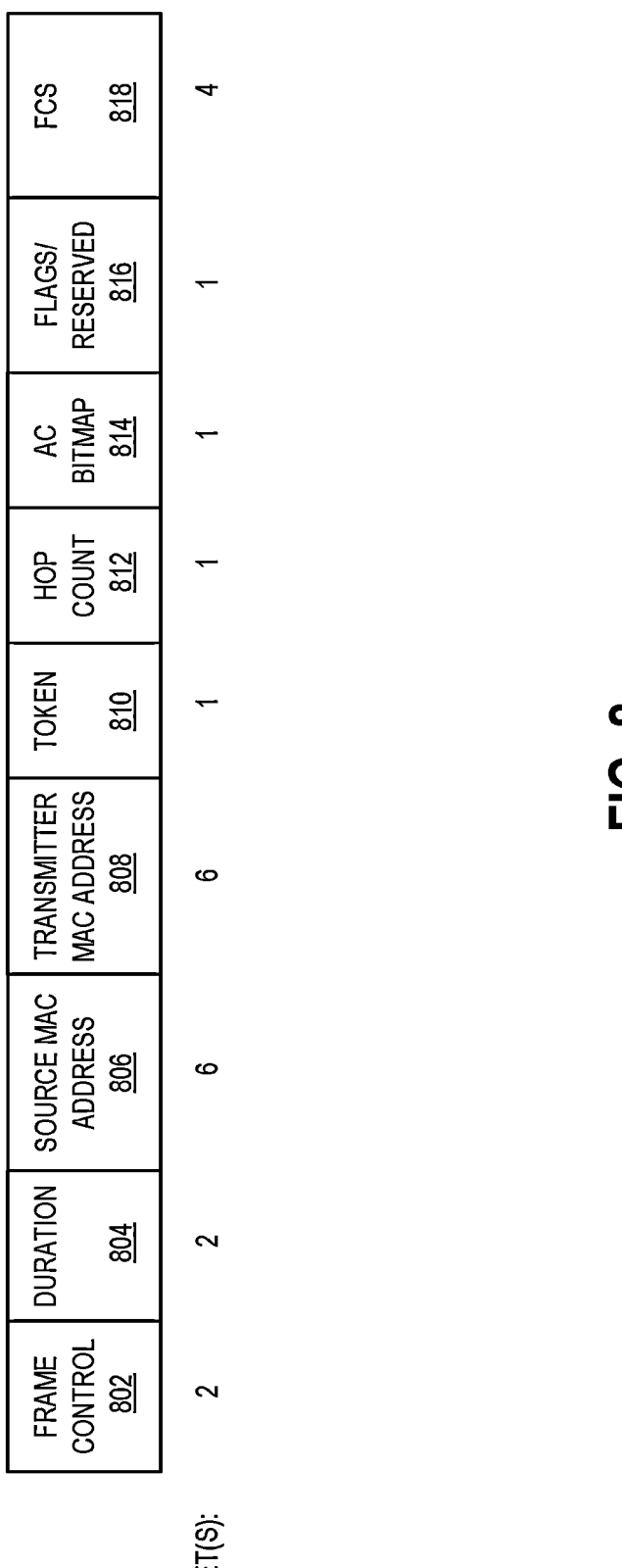
FIG. 8 illustrates the format of an example frame used to protect reserved high priority transmission periods in accordance with one embodiment.

FIG. 8 illustrates the format of an example HPE frame 800 used to protect reserved high priority transmission periods in accordance with one embodiment. It should be understood that the HPE frame 800 may comprise a set of attributes, where HPE frame 800 can be logically identified to be a tuple of this set of attributes.

A first attribute specifies the frame type (field 802) of HPE frame 800. Since the primary objective of the HPE frame is to aid and manage channel-access for a certain duration, a MAC Control frame is specified as the frame type for HPE frame 800. This can be indicated in the Type/Sub-type subfields of the Frame Control field in a standard WLAN MAC header, using a new value for the sub-type field that identifies the frame.

A second attribute specifies the source MAC address (field 806). This attribute in a given HPE frame, e.g., HPE frame 800, is the MAC address of the AP that first transmitted the HPE frame on a given channel. The HPE frame can be retransmitted by other APs that receive it, but an AP that originally sent the HPE frame over the air may choose to not retransmit it again. This attribute can help in determining whether or not HPE frame retransmission should be performed. That is, for a received HPE frame, an AP can compare the source MAC address 806 to its own MAC address, and accordingly decide whether or not to retransmit the HPE frame, e.g., if its MAC address is the same as the specified source MAC address, the HPE was already transmitted/retransmitted from this particular AP.

A third attribute specifies the transmitter MAC address (field 808). This attribute in a given HPE frame, e.g., HPE frame 800, is the MAC address of the AP that transmitted or retransmitted the HPE frame 800. For the HPE frame 800 that is being transmitted on a given channel for the first time, this attribute shall bear the same value as that of the source MAC address. On every retransmission of HPE frame 800, it shall be updated to the MAC address of the AP that retransmits it.

A fourth attribute specifies the duration of the LP-NAV (field 804). This attribute determines the time interval for which the LP-NAV shall be set in the AP as well as non-AP STAs that receive the HPE frame 800. Since the HPE frame 800 is intended to affect more than one (all) STAs across the OBSS networks operating on a given channel, there isn't a specific receiver MAC address that can be programmed in it. This is unlike other pre-existing/conventional frames that are currently used to set the NAV duration. Thus, for next-generation WLAN networks, the STAs that receive an HPE frame such as HPE frame 800 are allowed to set/extend the NAV as the LP-NAV duration in the Duration field 804 without regard for/a need to specify a receiver MAC address.

It should be noted that this attribute may be indicated in the Duration field of an IEEE 802.11 MAC header and can be extended as necessary for the NAV value in the PHY header of HPE frame 800. It should be understood that the PHY header may be dependent on versions/revisions of the 802.11 standard.

A fifth attribute may be a token attribute (field 810). This attribute in a given HPE frame, e.g., HPE frame 800, can be used to identify one particular HPE frame from one or more other HPE frame(s). In some embodiments, token field 810 should be set such that a given HPE frame can be uniquely identified by the values of the source MAC address (field 806) and the token (field 810) attributes. The uniqueness of this combination of attributes is preserved for a time duration that is at least equal to the time duration indicated by the duration (field 804) attribute. The token attribute is used to tie the retransmissions of an HPE frame with its original transmission. This can be used in deciding if the HPE frame needs to be retransmitted.

For example, if an AP receives an HPE frame with a source MAC address that matches its own MAC address and a token that it has used, the AP can confirm that it already transmitted the HPE frame (as alluded to above). In such a scenario, the AP may choose to ignore retransmitting the HPE frame.

A given AP may generate more than one HPE frame that may or may not overlap. That is, subsequent HPE frames may be generated even before the NAV (as determined by the duration attribute of the previous HPE frame(s) expires. I \n such cases, the source MAC address will be the same for all the HPE frames and the value of the duration attribute specified in field 804 need not be the same. The value of the token attribute specified in field 810 can aid in referencing the HPE frames uniquely in such conditions.

A sixth attribute can define hop count (field 812). The value of this hop count attribute shall be set with an initial value when an HPE frame is first transmitted on a given channel. For every retransmission of the frame, the retransmitting AP will reduce/decrement the value by one. An HPE frame received by an AP shall not be retransmitted if the value of this attribute in the received frame is zero. This is to ensure that retransmissions are stopped after a certain number of times.

If the value of the attribute in a received HPE frame is not zero, then the receiving AP may still choose to not retransmit the frame. For example, this may be the case in scenarios where the receiving AP has already transmitted or retransmitted another HPE frame whose LP-NAV value in the duration attribute is higher than that of the received HPE frame. This may also occur in cases where the receiving AP prefers a longer LP-NAV duration, and so transmits a new HPE frame instead (described above).

A seventh attribute may specify those HP ACs that are not blocked. That is, the AC bitmap field 814 reflects those HP ACs that are not blocked by the LP-NAV set of a given HPE frame, e.g., HPE frame 800. Since the next generation of WLAN networks may propose more than one new AC(s), the HPE frame should be able to indicate which of them can still access a channel(s).

Field 816 can include flag settings/states or can be used as a reserved field. This attribute includes future additions to the operations of the HPE frame while maintaining backward compatibility to prior versions.

The frame check sequence (FCS) field 818 can refer to an attribute that indicates whether or not HPE frame 800 has been reliably received.

Figure 9:
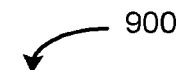
FIG. 9 illustrates an example computing component in which various embodiments described herein may be implemented.
Figure 9:
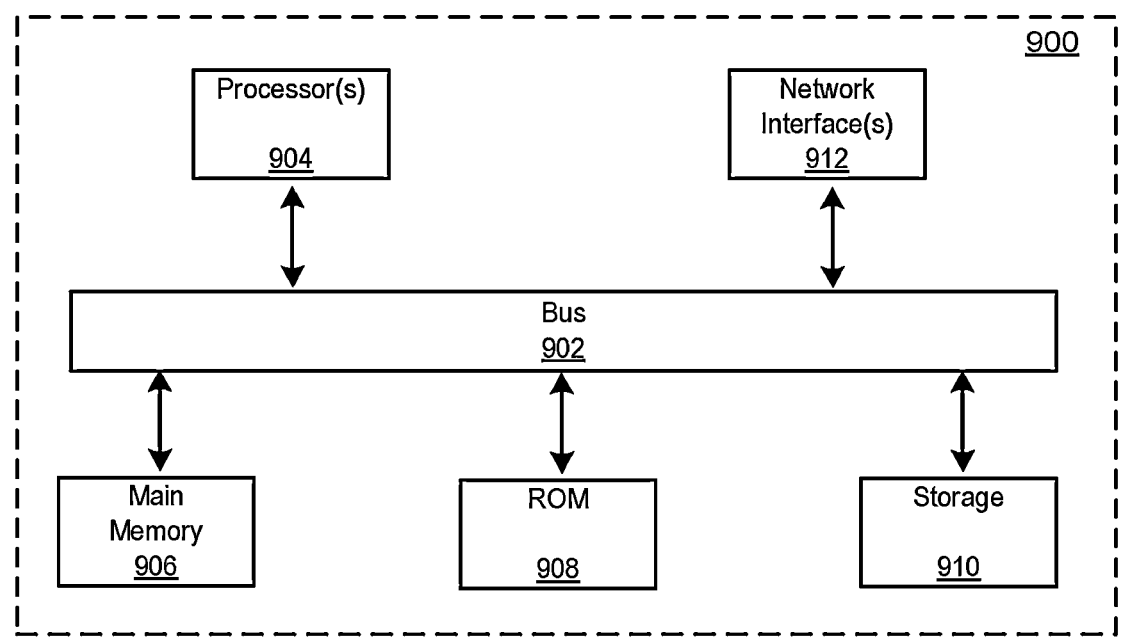

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may further include at least one network interface 912, such as a network interface controller (NIC), network adapter, or the like, or a combination thereof, coupled to bus 902 for connecting computer system 900 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
transmitting, from an access point, a high priority epoch (HPE) frame setting forth a reserved period for data associated with an access category or traffic identifier, the HPE frame comprising a tuple of attributes, a first attribute of the tuple of attributes defining the HPE frame to be a media access control (MAC) control frame;
enabling, via the transmitted HPE frame, data associated with a high priority access category to be transmitted from one or more stations during the reserved period;
determining if a source MAC address set forth in the tuple of attributes of the HPE frame matches a MAC address associated with the access point, and ignoring retransmission of the HPE frame upon a determination that the source MAC address matches the MAC address associated with the access point; and
enabling, via the transmitted HPE frame, data associated with a non-high priority access category to be transmitted from one or more stations only after the reserved period expires or is terminated.

2. The method of claim 1, wherein the tuple of attributes comprises a second attribute defining a source MAC address identifying a particular access point (AP) that first transmitted the HPE frame.

3. The method of claim 1, wherein the tuple of attributes comprises a third attribute defining a transmitter MAC address identifying a particular access point (AP) that transmitted or rebroadcasted the HPE frame.

4. The method of claim 1, wherein the tuple of attributes comprises a fourth attribute defining a duration of the reserved period.

5. The method of claim 4, wherein the duration of the reserved period is set forth as a low priority network allocation vector (LP-NAV).

6. The method of claim 5, wherein stations receiving the HPE frame set or extend a NAV in accordance with the LP-NAV.

7. The method of claim 1, wherein the tuple of attributes comprises a fifth attribute defining a token identifying the HPE frame from other transmitted HPE frames.

8. The method of claim 1, wherein the HPE frame is transmitted via an 802.11 wireless standard protocol.

9. The method of claim 1, wherein the tuple of attributes comprises a sixth attribute defining a hop count, a value of the hop count limiting a number of times the HPE frame is allowed to be retransmitted.

10. The method of claim 9, wherein the hop count is continuously decremented following each rebroadcasting of the HPE frame.

11. The method of claim 1, wherein the tuple of attributes comprises a seventh attribute defining the access categories or traffic identifiers allowed to be transmitted during the reserved time period.

12. The method of claim 1, wherein the tuple of attributes comprises an eighth attribute indicative of a flag setting or reserved field for maintaining backward compatibility with non-extremely high throughput stations.

13. The method of claim 1, wherein the tuple of attributes comprises a ninth attribute defining a frame check sequence indicating whether the HPE frame has been reliably received.

14. The method of claim 1, wherein the high priority traffic and the non-high priority traffic is received on the same channel.

15. The method of claim 1, further comprising protecting against frame bursts about to be transmitted by transmitting the HPE frame subsequent to expiration of a point coordination function interframe space (PIFS).

16. The method of claim 1, further comprising transmitting the HPE frame without acknowledging a frame burst currently being transmitted.

17. A method, comprising:

programming, by a first access point (AP), a hop count and a token uniquely identifying a high priority epoch (HPE) frame setting forth a reserved period for data associated with a high priority access category, the HPE frame comprising a tuple of attributes, a first attribute of the tuple of attributes defining the HPE frame to be a media access control (MAC) control frame, a second attribute of the tuple of attributes setting forth the hop count, a third attribute of the tuple of attributes setting forth value of the token;

transmitting, from the access point, the high priority epoch (HPE) frame;

receiving, at the access point, data associated with a high priority access category from one or more stations during the reserved period; and receiving, at the access point, data associated with a non-high priority access category from one or more stations only after the reserved period expires or is terminated;

wherein the HPE frame is formatted according to a particular retransmission format scheme, where the particular retransmission format scheme defines that a second AP receiving the HPE frame is permitted to retransmit the HPE frame after decrementing a non-zero hop count of the HPE frame and reducing an amount of time specified in the reserved period.

18. The method of claim 17, wherein a second AP receiving the HPE frame retransmits the HPE frame by decrementing the hop count by a value of one only if the value of the hop count in the received HPE frame is a non-zero value.

19. The method of claim 18, wherein the reserved time set forth by the retransmitted HPE frame comprises the original reserved time period less time expired since transmission by the first AP of the HPE frame.

20. The method of claim 17, wherein the HPE frame is transmitted via an 802.11 wireless standard protocol.

* * * * *